Patented Oct. 29, 1935

2,019,337

UNITED STATES PATENT OFFICE 2,019,337

NITROCHLOR POLYPHENYL COMPOUND AND PROCESS OF MAKING SAME

Frank M. Clark, Pittsfield, Mass., assignor to General Electric Company, a corporation of New York No Drawing. Application October 27, 1933, Serial No. 695,508

6 Claims. (Cl. 260—142)

The present invention comprises new compositions having a combination of desirable properties and particularly a high dielectric constant rendering them especially suitable for dielectric use in capacitors and other electrical devices.

In my prior U. S. Patent 1,931,455, patented October 17, 1933, I have described halogenated derivatives of diphenyl which are suitable for dielectric purposes, and which consist of a mixture of various isomers of such halogenated compounds.

I have discovered that compounds having even higher dielectric constant can be produced by introducing a nitro group into such compounds, for example, by suitable treatment with nitric acid.

The following example will serve to illustrate suitable compositions containing both the chlorine and nitro group suitable for use as dielectric material:

Example 1

800 grams of the pentachlor diphenyl product descibed in Patent 1,931,455 was heated and agitated for about two hours with 1100 grams of concentrated nitric acid and 1600 grams of concentrated sulphuric acid between 100 and 110° C. A semi-resinous viscous product resulted, which may be washed with water, aqueous caustic, and dried. It has a viscosity of 145 seconds Saybolt at 100° C., specific gravity of 1.56 (referred to water at 15° C.), and a pour point of plus 45° C. It has the unusually high dielectric constant of 7 at 100° C., 1000 cycles.

Example 2

The same amounts of ingredients taken in Example 1 were heated for 6 hours and the product purified. A product with a viscosity of 182 seconds Saybolt at 100° C., a specific gravity of 1.58 (referred to water at 15° C.), and a pour point of plus 53° C., was obtained. This material had a dielectric constant of 8 when tested at 100° C., 1000 cycles.

Example 3

When the same amounts of ingredients stated in Example 1 were heated for 15 hours a product having a viscosity of 205 seconds Saybolt at 100° C., a specific gravity of 1.58 (referred to water at 15° C.) and a pour point of plus 56° C., was obtained. This material possesses a dielectric constant of 8 which is the same as the dielectric constant of the composition obtained in Example 2. It may be used, however, where material of a higher viscosity and a higher pour point than the composition obtained in the second example is desired.

The compositions described above are all non-sludging. The resistivity of the compositions varies with their degree of purity. The compositions without special purification have a resistivity of $25 \times 10^9$ ohms per centimeter cubed which makes them adaptable for use as dielectric material.

The nitro-chlor derivatives of other pholyphenyl compounds, such for example as diphenyl oxide, diphenyl methane, dibenzyl and diphenyl ketone, possess high dielectric constants and are suitable for use in capacitors and other electrical apparatus where a composition of this type is desired. It will be understood by those skilled in the art that other halogens such as bromine, fluorine and the like, may be substituted for chlorine in the nitrochlor polyphenyls without departing from the scope of my invention.

What I claim as new and desire to secure by Letters Patent of the United States is:

1. The process which consists in subjecting a mixture of isomers of halogenated polyphenyls with a nitrating mixture of nitric and sulphuric acids for about two to fifteen hours to a reaction temperature at which a semi-resinous product is obtained.

2. The process which consists in treating pentachlor diphenyl with concentrated nitric acid and concentrated sulphuric acid at a temperature of 100° to 110° C. until a semi-resinous compound is produced.

3. A composition comprising essentially a semi-resinous polyphenyl compound containing a nitro group and a halogen radical, and having a pour point within the range of about 45 to 56° C.

4. A composition consisting essentially of a semi-resinous viscose nitrochlor diphenyl derivative having a viscosity of about 145 seconds Saybolt at 100° C., a specific gravity of 1.56 and a pour point of about 45° C.

5. A dielectric material consisting essentially of semi-resinous nitrochlor diphenyl having a dielectric constant of about 7 to 8.

6. A dielectric material suitable as a capacitor impregnant consisting essentially of a semi-resinous chlorinated diphenyl compound containing a combined nitro group, having a viscosity within a range of about 145 to 205 seconds Saybolt at 100° C., a specific gravity of about 1.56 to 1.58, a pour point within a range of about 45 to 56° C., a dielectric constant of about 7 to 8 at 100° C., 1000 cycles and a resistivity of about $25 \times 10^9$ ohms per c. m. cubed.

FRANK M. CLARK.